United States Patent [19]
Ashida

[11] Patent Number: 4,961,131
[45] Date of Patent: Oct. 2, 1990

[54] PROGRAMMABLE CONTROLLER

[75] Inventor: Kazuhide Ashida, Fuchu, Japan

[73] Assignee: Kabushiki Kaisha Toshiba, Kanagawa, Japan

[21] Appl. No.: 183,991

[22] Filed: Apr. 20, 1988

[30] Foreign Application Priority Data

Apr. 27, 1987 [JP] Japan .................................. 62-101739

[51] Int. Cl.⁵ ............................................. G06F 15/46
[52] U.S. Cl. .................................... 364/140; 364/132; 364/136
[58] Field of Search ............... 364/132, 136, 140, 141, 364/147, 200, 900

[56] References Cited

U.S. PATENT DOCUMENTS

| | | | |
|---|---|---|---|
| 4,048,625 | 9/1977 | Harris, Jr. et al. | 364/900 |
| 4,064,395 | 12/1977 | Schubeler et al. | 364/136 |
| 4,165,534 | 8/1979 | Dummermuth et al. | 364/141 |
| 4,215,399 | 7/1980 | Pavicic et al. | 364/141 |
| 4,425,630 | 1/1984 | Yomogida et al. | 364/141 |
| 4,488,258 | 12/1984 | Stuger et al. | 364/147 |
| 4,534,011 | 8/1985 | Andrews et al. | 364/900 |
| 4,648,068 | 3/1987 | Ninnemann et al. | 364/136 |
| 4,663,730 | 5/1987 | Ikeda | 364/132 |

Primary Examiner—Jerry Smith
Assistant Examiner—Paul Gordon
Attorney, Agent, or Firm—Finnegan, Henderson, Farabow, Garrett, and Dunner

[57] ABSTRACT

A programmable controller includes a master CPU for processing data in accordance with a predetermined program including a prescribed sequence of operating steps, a plurality of operating devices responsive to the master CPU, each having at least two operating states, a monitor device for displaying the execution state of a predetermined number of steps in response to batch processing by the master CPU, and a slave CPU. The slave CPU includes a command execution circuit for generating command output information in response to the execution of each operating step, a register for storing the command output information and the operating state of selected operating devices, and a counter for counting the predetermined number of executed operating steps in the sequence of the program.

3 Claims, 4 Drawing Sheets

PROGRAMMABLE CONTROLLER

BACKGROUND OF THE INVENTION

This invention relates to a programmable controller and more particularly to a controller having master and slave Central Processing Units (hereinafter referred to as CPU).

An example of a typical sequence program programmed by a ladder diagram is shown in FIG. 1. A system diagram of a typical programmable controller (hereinafter referred to as PC) is shown in FIG. 2. For PC programming and execution monitoring, a programmable controller having a graphic display corresponding to FIG. 1 is used.

In the graphic display, contacts or coils in the ON state are displayed by means of higher brightness, or by means of a colour change. Also, the path through which the current passes from the left bus to the right-end coil is indicated by increased brightness, so that the state of command execution and/or condition under which output is obtained can be ascertained visually.

To achieve this graphic representation, every time a command is executed, the ON/OFF information of the operand devices(relays and coils) that are used for executing that command, and the ON/OFF information of the output, which is determined by the input to these commands and the state of devices, must be accumulated by the CPU.

When these items of bit data are stored in the PC memory, to increase the efficiency of memory usage, they are stored in order of bit units, from the head of the word.

The aforesaid processing is executed by software of the CPU. However, in an ordinary CPU there are no bit operation commands, so these must be realized by a combination of shift processing and logic calculation. This processing is therefore fairly complex, as shown by the flow-chart of FIG. 3. In particular, the number of calculation steps becomes large on moving to the next word when the memory of one word becomes full. Also, since this processing is performed every time a command is executed, program execution during monitoring becomes appreciably slower than what it is when monitoring is not performed.

Recently, PCs have been required to have increasingly high data processing capability, numerical calculation capability and high sequence calculation processing capability. However, ordinary CPUs, although they are fast with numerical and data calculation, are slow at execution of sequence commands. As a result, processing time can be shortened by using a special purpose CPU for sequence calculation.

PCs have therefore appeared wherein processing is shared between a master CPU, for executing the operating system program and for processing of numerical data, and a slave CPU for executing sequence programs, such as those realized by the ladder diagram. These CPUs are used under time sharing, as required.

However, in monitoring, even in such a PC, the slave CPU interrupts the master CPU to make it read the ON/OFF information of the executed command output and of the devices corresponding to each command.

Consequently, when monitoring is performed, the execution speed is markedly lower.

SUMMARY OF THE INVENTION

It is an object of the present invention to maintain the capability of a programmable controller to execute programs during monitoring of the execution of commands.

Another object of the invention is to make it possible to monitor a predetermined number of sequence commands at one time with the master CPU of the programmable controller.

Additional objects and advantages will be obvious from the description which follows, or may be learned by the practice of the invention.

The foregoing objects are achieved according to the present invention by providing a programmable controller includes a master CPU for processing data in accordance with a predetermined program including a prescribed sequence of operating steps, a plurality of operating devices responsive to the master CPU, each having at least two operating states, a monitor device for displaying the execution state of a predetermined number of steps in response to batch processing by the master CPU, and a slave CPU.

The slave CPU, includes a command execution circuit for generating command output information in response to the execution of each operating step, a register for storing the command output information and the operating state of selected operating devices, and a counter for counting the predetermined number of executed operating steps in the sequence of the program.

DETAILED DESCRIPTION OF THE PREFERRED EMBODIMENTS

Figure 4:
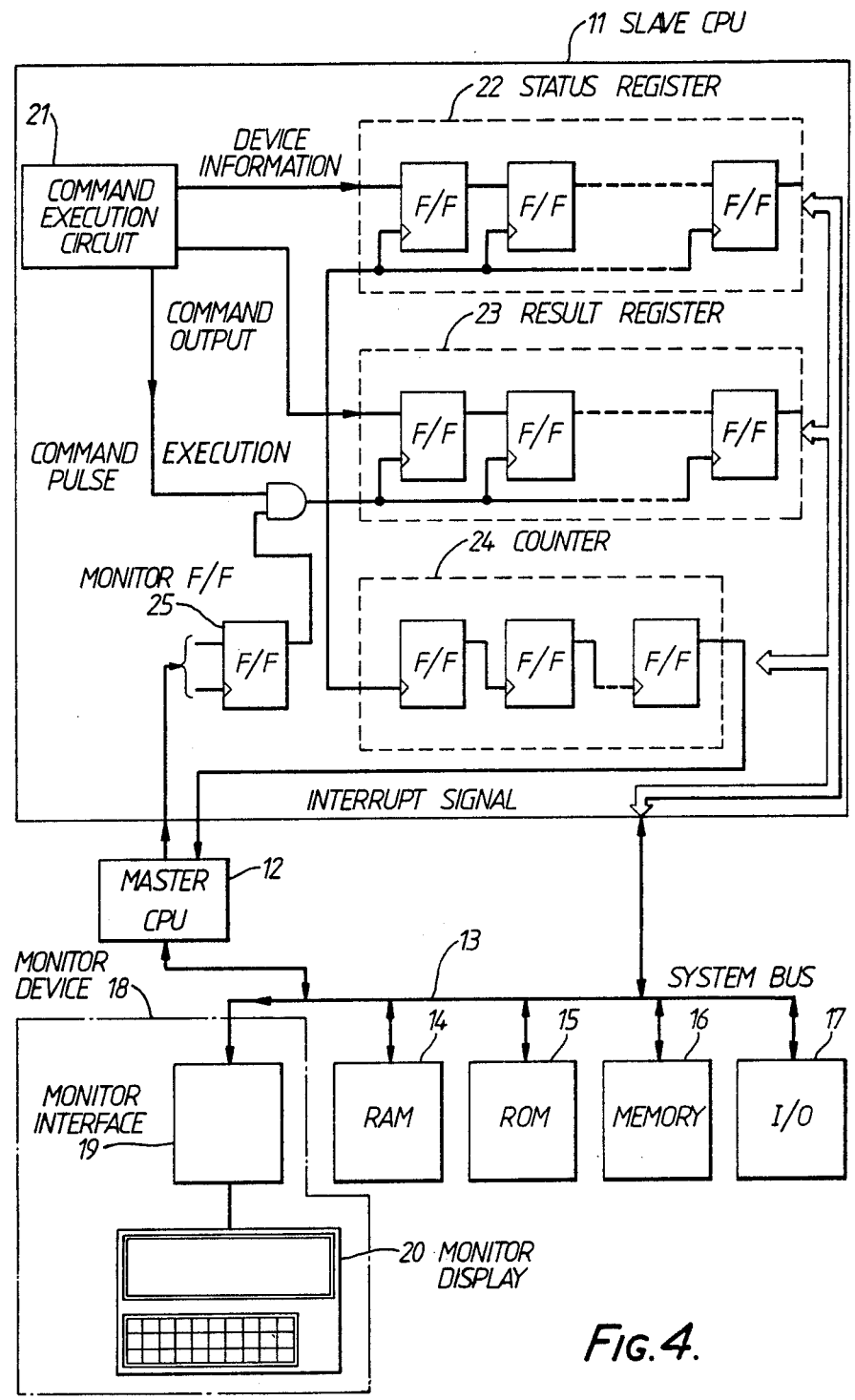
FIG. 4 is a system diagram showing an embodiment of a programmable controller according to the invention.

FIG. 4 shows an embodiment of this invention which includes a slave CPU 11, a master CPU 12, a system bus 13, a RAM 14 for program execution, a ROM 15 in which the PC system programs are stored, a memory 16, for storing user programs, an I/O 17 for the PC, and a monitor device 18.

The slave CPU 11 includes a command execution circuit 21, a status register 22 for storing device information regarding which devices of the command execution circuit 21 are in the on or off states, a result register 23 for storing command output, a counter 24 for counting the number of monitored commands, and a monitor flip-flop (F/F) 25 for indicating whether or not monitoring is in progress.

The monitor device 18 includes a monitor interface 19, and a monitor display 20.

The status register 22 and the result register 23 are respectively constituted by shift registers. The status register 22 receives on/off state information of devices of the command execution circuit 21 and the result register 23 receives command output from the command execution circuit 21.

When the F/F 25 is set, a command execution pulse is supplied from the command execution circuit 21 as a clock input to the two registers 22, 23 and the counter 24, so that the content of the shift registers is shifted every time a command is executed, and each bit data is time-sequentially accumulated, and the counter 24 is progressively incremented.

When the counter 24 has counted up to the bit width of the registers, carry of the highest column occurs. This carry signal is supplied to the master CPU 12 to be utilized as an interrupt signal.

When the interrupt signal is supplied to the master CPU 12, the content of each register is read. This read operation resets the counter 24, and the interrupt signal is also reset. Thus, monitoring of the next command becomes possible.

As described above, when the number of stored commands in the registers reaches a predetermined level, the master CPU reads the contents of each register.

A result of the read operation is displayed through the monitor device 18. The monitor display 20 displays the monitor view and the monitor interface 19 controls the monitor view using the master CPU 12.

Figure 5:
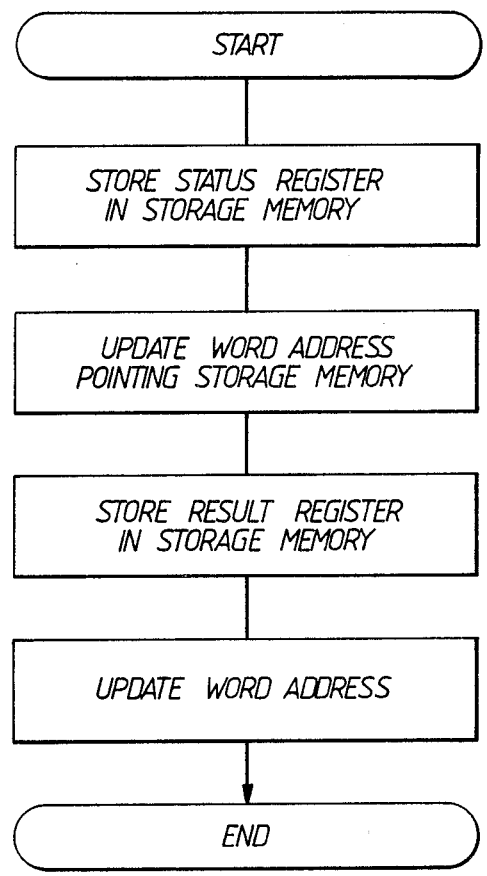
FIG. 5 is a flow-chart showing the sequence of monitoring processing of a programmable controller according to the invention.

FIG. 5 shows a flow-chart of the processing sequence of the master CPU 12. It can be seen that processing is greatly simplified, compared with the conventional system shown in FIG. 3, in which monitor processing is executed by means of bit calculations performed by the master CPU 12.

Figure 1:
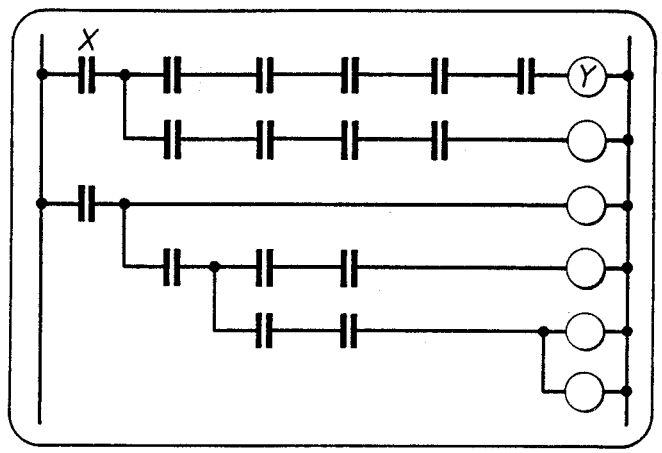
FIG. 1 is a view showing an example of a graphic display of a conventional sequence program.
Figure 2:
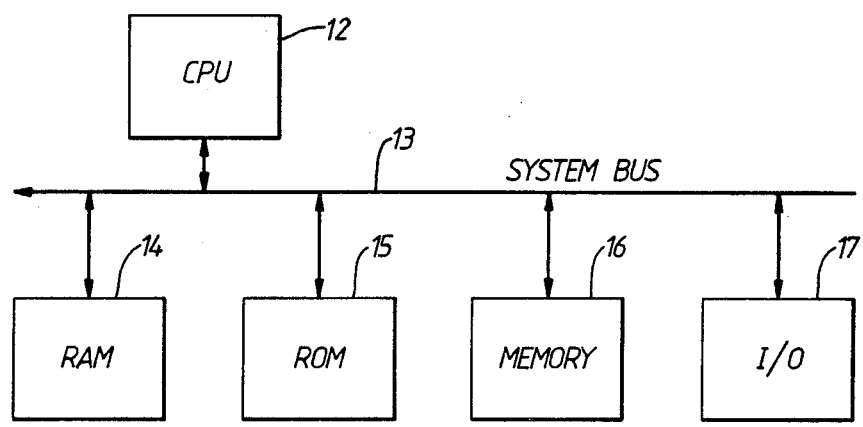
FIG. 2 is a system diagram showing a conventional programmable controller.
Figure 3:
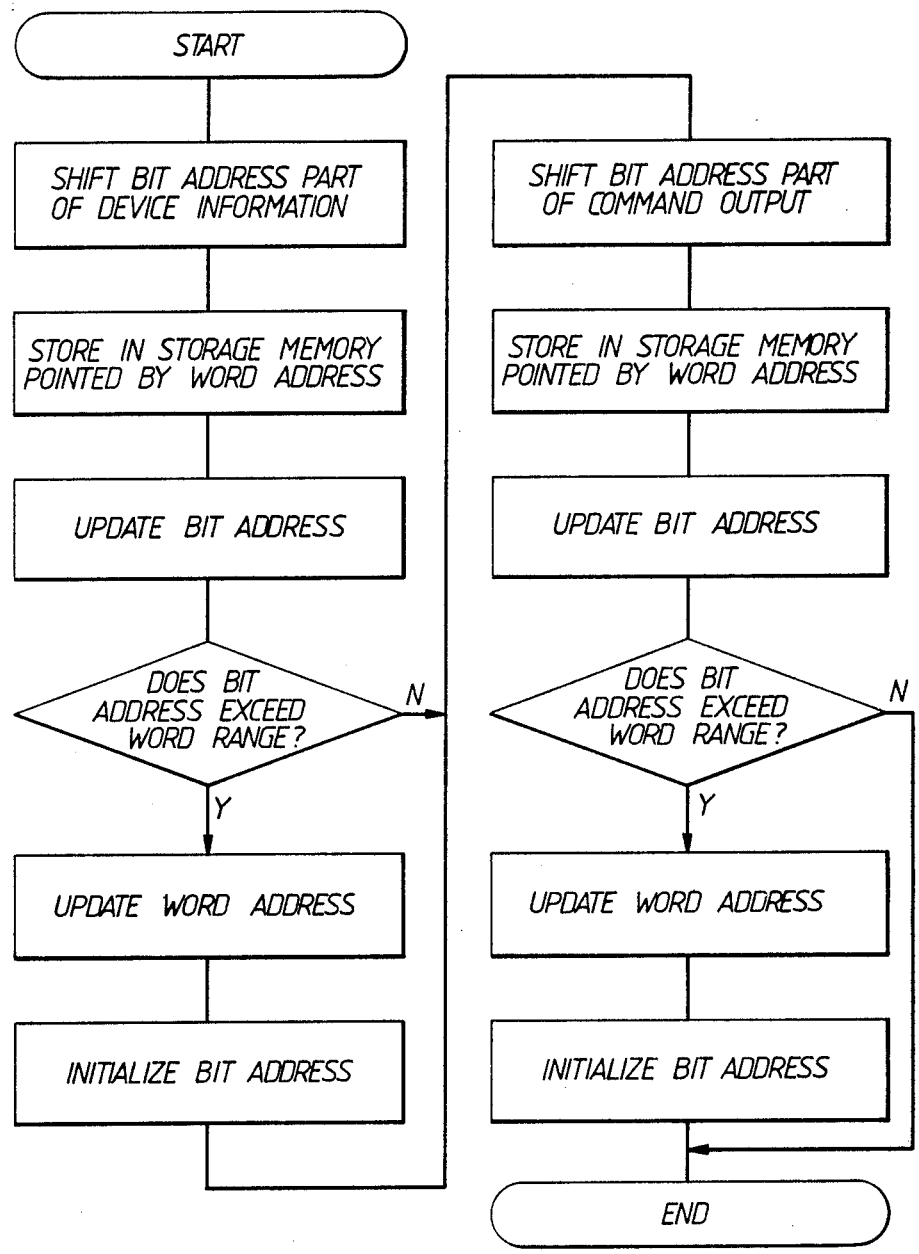
FIG. 3 is a flow-chart showing the sequence of monitoring processing of a conventional programmable controller.

Also, compared with the processing of FIG. 3, which must be performed for each command, the processing of FIG. 5 can be carried out only once for a plurality of commands. This shortens the processing time considerably.

It may be noted that the processing of the slave CPU 11 is performed at the same time as command execution, so there is substantially no variation in processing time.

As explained above, with a programmable controller according to this invention, a counter and registers monitor the command execution, and a slave CPU is provided for sequence computation. The bit data that is the subject of monitoring when commands are being executed is converted to a form that is easily processed by the master CPU that performs monitoring processing, and this data is transferred to the master CPU.

Thus, the frequency of such processing is reduced, and the load on the master CPU during command execution monitoring can be greatly decreased. Thus, the speed of program execution during command execution monitoring can be effectively increased.

What is claimed is:

1. A programmable controller, comprising:
   a master CPU for processing data in accordance with a predetermined program including a prescribed sequence of operating steps;
   a plurality of operating devices responsive to the master CPU, each having at least two operating states;
   a slave CPU, operatively coupled to the master CPU and including command execution circuit means for generating command ouput information in response to the execution of each operating step;
   register means, operatively coupled to the command execution circuit means, for storing the command output information and the operating state of selected operating devices;
   counting means, operatively coupled to the command execution circuit means and the master CPU, for counting a predetermined number of executed operating steps in the sequence of the program in response to the command output information from the command execution circuit means, and for providing an output signal to the master CPU upon counting up to the predetermined number of executed operating steps; and
   monitor means, responsive to processing performed by the master CPU, for displaying the execution state of the predetermined number of steps.

2. The controller of claim 1, wherein the register means includes status register means for storing the operating state of the operating devices, and result register means for storing the command output information.

3. The controller of claim 1, wherein the monitor means includes monitor display means for displaying a prescribed monitor view showing the execution state of the operating steps, and monitor interface means for controlling the monitor view in response to the master CPU.

* * * * *